(12) United States Patent
Usui

(10) Patent No.: US 9,633,429 B2
(45) Date of Patent: Apr. 25, 2017

(54) PATTERN OUTLINE EXTRACTION DEVICE, PATTERN OUTLINE EXTRACTION METHOD, AND COMPUTER PROGRAM PRODUCT

(71) Applicant: Kabushiki Kaisha Toshiba, Minato-ku (JP)

(72) Inventor: Satoshi Usui, Nagoya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/955,407

(22) Filed: Dec. 1, 2015

(65) Prior Publication Data
US 2017/0039698 A1 Feb. 9, 2017

(30) Foreign Application Priority Data
Aug. 7, 2015 (JP) ................................. 2015-157379

(51) Int. Cl.
*G06K 9/00* (2006.01)
*G06T 7/00* (2017.01)

(52) U.S. Cl.
CPC .......... *G06T 7/0006* (2013.01); *G06T 7/0085* (2013.01); *G06T 2207/10061* (2013.01); *G06T 2207/10144* (2013.01); *G06T 2207/10148* (2013.01); *G06T 2207/30148* (2013.01)

(58) Field of Classification Search
CPC ..... G03F 1/36; G06K 9/4604; G06F 17/5081; H01L 21/0271

USPC .......................................................... 382/145
See application file for complete search history.

(56) References Cited

U.S. PATENT DOCUMENTS

| 7,816,062 B2 | 10/2010 | Nagatomo et al. |
| 8,334,968 B2 | 12/2012 | Tsujita et al. |
| 8,481,936 B2 | 7/2013 | Shishido et al. |

(Continued)

FOREIGN PATENT DOCUMENTS

| JP | 2009-302206 | 12/2009 |
| JP | 4778778 | 9/2011 |
| JP | 5319931 | 10/2013 |

*Primary Examiner* — Manuchehr Rahmjoo
(74) *Attorney, Agent, or Firm* — Oblon, McClelland, Maier & Neustadt, L.L.P.

(57) ABSTRACT

According to one embodiment, a pattern outline extraction device includes a control unit, a secondary storage unit and a memory. The control unit reads the image data of the patterns formed by changing the process condition, and extracts outlines of the patterns from the image data. The control unit superposes the outlines, and sets straight measurement lines. The control unit calculates variations on the measurement lines relative to measurement points on the measurement lines at points of intersection of the measurement lines and the outlines, and calculates variation-process condition correspondence information. The control unit calculates predicted variations on the measurement lines relative to the measurement points corresponding to a desired process condition based on the variation-process condition correspondence information, calculates calculated points that are obtained by adding the predicted variations to the measurement points on the measurement lines, and calculates a predicted outline by connecting the calculated points.

20 Claims, 13 Drawing Sheets

(56) References Cited

U.S. PATENT DOCUMENTS

| | | | | |
|---|---|---|---|---|
| 2004/0029023 A1* | 2/2004 | Misaka | ............... | G03F 1/26 |
| | | | | 430/5 |
| 2009/0074287 A1* | 3/2009 | Kawashima | ............ | G03F 1/36 |
| | | | | 382/144 |
| 2010/0183959 A1* | 7/2010 | Higaki | ............... | G03F 1/36 |
| | | | | 430/5 |

* cited by examiner

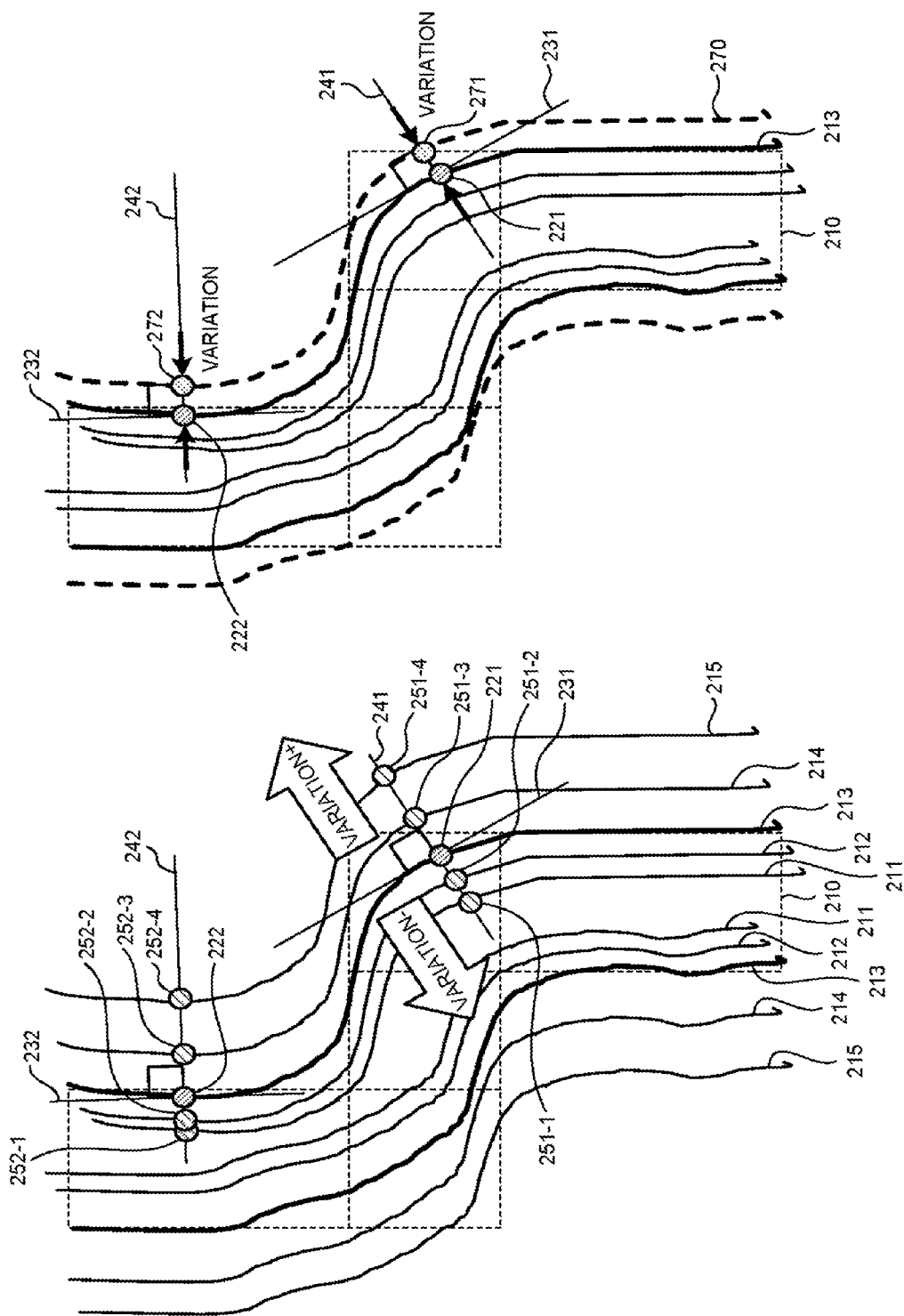

PATTERN OUTLINE EXTRACTION DEVICE, PATTERN OUTLINE EXTRACTION METHOD, AND COMPUTER PROGRAM PRODUCT

CROSS-REFERENCE TO RELATED APPLICATIONS

This application is based upon and claims the benefit of priority from Japanese Patent Application No. 2015-157379, filed on Aug. 7, 2015; the entire contents of which are incorporated herein by reference.

FIELD

Embodiments described herein relate generally to a pattern outline extraction device, a pattern outline extraction method, and a computer program product.

BACKGROUND

A semiconductor integrated circuit has come to have various configurations in recent years. Various patterns are arranged on a substrate to be processed in order to form such configurations. When the formed pattern is measured and converted into a numerical form, there has been used a dimensional value measured by a scanning electron microscope (SEM). In this case, there is a limit to how well a pattern having various forms is measured and converted into the numerical form. Accordingly, a method that extracts and evaluates an outline of the pattern from a picked-up SEM image is becoming more predominant. Two-dimensional indices such as an area and a positional deviation can thus be expressed in the numerical form by using the extracted outline.

Precision of the outline becomes very important in the method of extracting and evaluating the outline. In order to increase the precision of the outline, a large amount of outlines are acquired and averaged in the current situation. However, an enormous amount of time is required to acquire the large amount of outlines. Moreover, there has been acquired only an outline that is formed under a desired process condition.

BRIEF DESCRIPTION OF THE DRAWINGS

FIGS. 6A and 6B are diagrams each illustrating another example of the procedure in the pattern outline extraction method according to the first embodiment;

DETAILED DESCRIPTION

According to one embodiment, a pattern outline extraction device includes a control unit, a secondary storage unit, and a memory. The control unit calculates a predicted outline of a pattern acquired under a desired process condition by use of image data of patterns formed by changing a process condition. The secondary storage unit stores a program and data executed by the control unit. The memory temporarily stores the program and the data stored in the secondary storage unit to be executed by the control unit. The control unit reads the image data of the patterns formed by changing the process condition. The control unit extracts outlines of the patterns from the image data formed under the process condition, and superposes the outlines. The control unit sets straight measurement lines intersecting with the outlines being superposed. The control unit calculates variations on the measurement lines relative to measurement points on the measurement lines at points of intersection of the measurement lines and the outlines. The control unit calculates variation-process condition correspondence information indicating a relationship between the process conditions and the variations for the measurement lines. The control unit calculates predicted variations on the measurement lines relative to the measurement points corresponding to a desired process condition based on the variation-process condition correspondence information. The control unit calculates calculated points that are obtained by adding the predicted variations to the measurement points on the measurement lines for the measurement lines. And the control unit calculates a predicted outline by connecting the calculated points.

A pattern outline extraction device, a pattern outline extraction method, and a computer program product according to embodiments will now be described in detail with reference to the drawings. The present invention is not limited to the following embodiments.

First Embodiment

Figure 1:
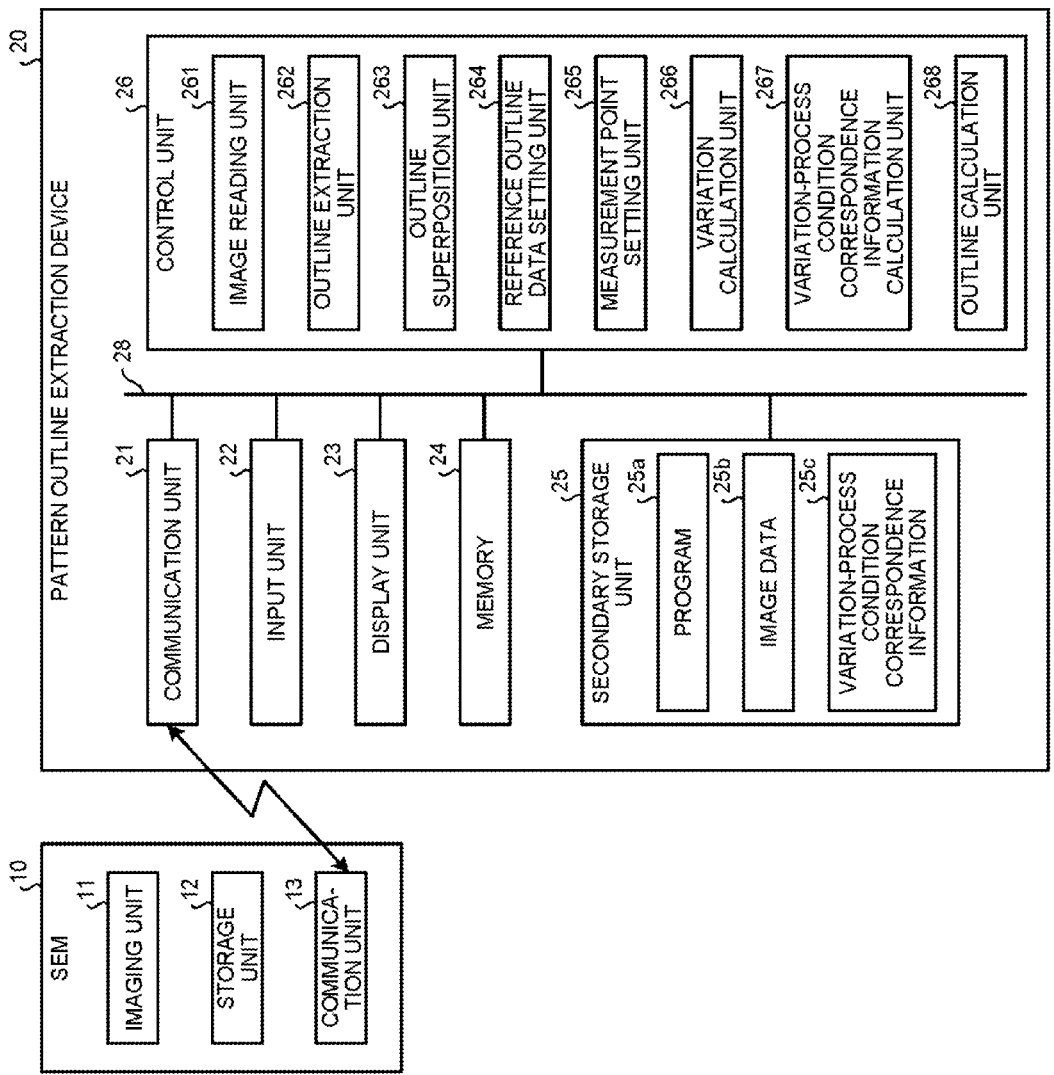
FIG. 1 is a block diagram illustrating an example of a configuration of a pattern outline extraction system that includes a pattern outline extraction device according to a first embodiment.

FIG. 1 is a block diagram illustrating an example of a configuration of a pattern outline extraction system including a pattern outline extraction device according to a first embodiment. The pattern outline extraction system includes an SEM 10 and a pattern outline extraction device 20.

The SEM 10 includes an imaging unit 11, a storage unit 12, and a communication unit 13. The imaging unit 11 images a pattern formed on a substrate to be processed by using a lithography technique. The pattern on the substrate to be processed is formed under various process conditions. An example of the process condition includes an exposure (dose) and a focal position (focus). Here, a plurality of patterns formed while changing the exposure or the focal position is formed on the substrate to be processed, and each pattern is imaged by the imaging unit 11.

The storage unit 12 stores an image imaged by the imaging unit 11. The storage unit 12 is formed of a non-volatile memory device such as a hard disk drive (HDD) or a solid state drive (SSD). The communication unit 13 communicates with the pattern outline extraction device 20. Here, the communication unit 13 transmits the image stored in the storage unit 12 to the pattern outline extraction device 20.

The pattern outline extraction device 20 is configured such that a communication unit 21, an input unit 22, a display unit 23, a memory 24, a secondary storage unit 25, and a control unit 26 are connected to one another through a bus 28. The pattern outline extraction device 20 is an information processing device such as a personal computer capable of running a pattern outline extraction program.

The communication unit 21 performs reception of an image from the SEM 10. The input unit 22 is an input device that inputs an instruction to the pattern outline extraction device 20. The input unit 22 is constituted by a keyboard, a mouse and the like. The display unit 23 is a display device capable of displaying an image or video. The display unit 23 is a liquid crystal display or an organic electroluminescence (EL) device, for example. Note that the input unit 22 and the display unit 23 may be constituted by a touch panel.

The memory 24 temporarily stores data and a program used by the control unit 26 when performing control. Various types of random access memory (RAM) can be used as the memory 24.

The secondary storage unit 25 stores a program 25a including the pattern outline extraction program executed by the pattern outline extraction device 20, image data 25b acquired from the SEM 10, and variation-process condition correspondence information 25c to be described. The secondary storage unit 25 is an HDD or SSD, for example.

The control unit 26 loads the program 25a stored in the secondary storage unit 25 to the memory 24 and executes the program. The control unit 26 is constituted by one or a plurality of central processing units (CPUs) and a peripheral circuit. The control unit 26 includes an image reading unit 261, an outline extraction unit 262, an outline superposition unit 263, a reference outline data setting unit 264, a measurement point setting unit 265, a variation calculation unit 266, a variation-process condition correspondence information calculation unit 267, and an outline calculation unit 268.

The image reading unit 261 reads the image data 25b stored in the secondary storage unit 25. Here, the image reading unit reads a plurality of the image data 25b relevant to a certain pattern formed by changing the process condition. The image data 25b of each pattern acquired by assigning thereto the exposure as the process condition is read, for example. The outline cannot be acquired precisely under a desired process condition when the number of the image data 25b is small. Accordingly, it is desired to use the image data 25b of patterns formed under no less than five different kinds of process conditions. The image reading unit 261 constitutes a reading unit.

The outline extraction unit 262 extracts an outline of a formed pattern from the image data 25b being read. Processing performed to extract the outline of the pattern from image data is known and will not be described. The outline extraction unit 262 constitutes an outline extraction unit.

The outline superposition unit 263 superposes the extracted outlines. The outline superposition unit calculates a centroid position of the outline and superposes the plurality of outlines such that their centroid positions correspond with one another, for example. The outline superposition unit 263 constitutes a superposition unit.

The reference outline data setting unit 264 sets reference outline data to be a reference among the superposed outlines. When the superposed outlines are displayed on the display unit 23, for example, an outline selected by a user through the input unit 22 is set as the reference outline data. Alternatively, it may be adapted to automatically set an outline at a predetermined position as the reference outline data among the plurality of outlines.

The measurement point setting unit 265 sets a measurement point on the reference outline data. The measurement point serves as a reference position when measuring a variation. The measurement point setting unit 265 may automatically set a predetermined number of measurement points at a predetermined position on the reference outline data or may set the measurement point at a position selected by the user through the input unit 22. The larger the number of measurement points being set, the better in order to increase the precision of the outline.

The variation calculation unit 266 finds a point of intersection of a predetermined straight line passing through the measurement point set on the reference outline data and another outline, and calculates a distance between the measurement point and each point of intersection as the variation. In the first embodiment, the variation calculation unit 266 finds a tangent line at the measurement point on the reference outline data as well as a perpendicular line of the tangent line at the measurement point. The variation calculation unit 266 then calculates a distance relative to the measurement point on the perpendicular line at the point of intersection as the variation and stores it in association with a parameter of the process condition. The variation calculation unit 266 performs this processing for each measurement point. The reference outline data setting unit 264, the measurement point setting unit 265 and the variation calculation unit 266 constitute a variation calculation unit.

The variation-process condition correspondence information calculation unit 267 calculates the variation-process condition correspondence information 25c indicating correspondence between the parameter of the process condition and the variation. Specifically, a combination of the parameter of the process condition and the variation pertaining to a certain perpendicular line is plotted on a coordinate system with a horizontal axis representing the parameter of the process condition and a vertical axis representing the variation. Then, a least squares method is used to calculate an approximation curve of the plotted point. An expression representing the approximation curve is the variation-process condition correspondence information. The variation-process condition correspondence information calculation unit 267 saves the calculated variation-process condition correspondence information 25c in association with the perpendicular line or the measurement point into the secondary storage unit 25. The variation-process condition correspondence information calculation unit 267 constitutes a correspondence information calculation unit.

The outline calculation unit 268 calculates the variation under a desired process condition for each perpendicular line by using the variation-process condition correspondence information 25c. The outline calculation unit 268 further finds a predicted position obtained by adding the variation to the measurement point on each perpendicular line and calculates a predicted outline by connecting the predicted positions. The outline calculation unit 268 then displays the calculated predicted outline on the display unit 23. The outline calculation unit 268 forms an outline calculation unit.

Figure 2:
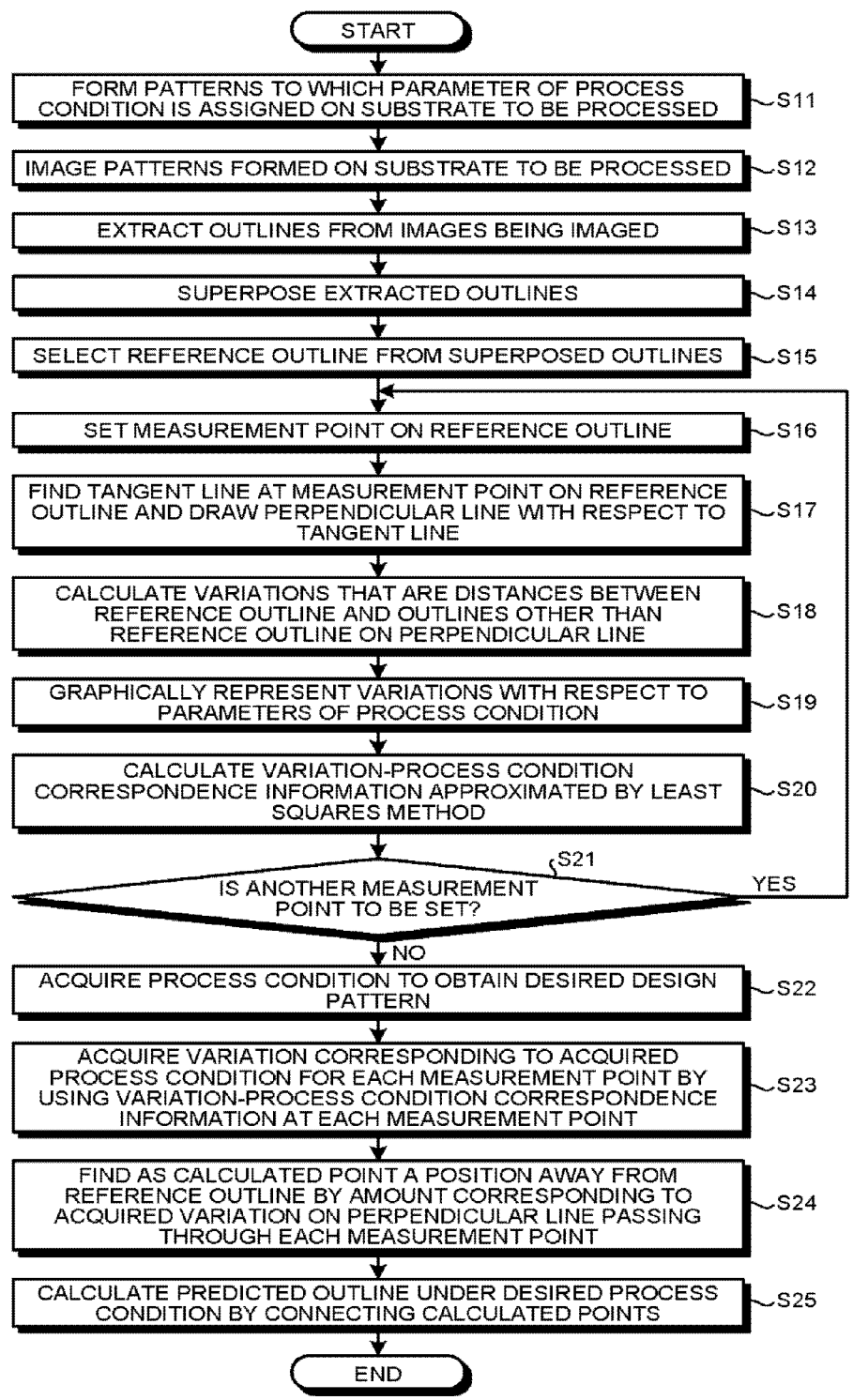
FIG. 2 is a flowchart illustrating an example of a procedure in a pattern outline extraction method according to the first embodiment.
Figure 3:
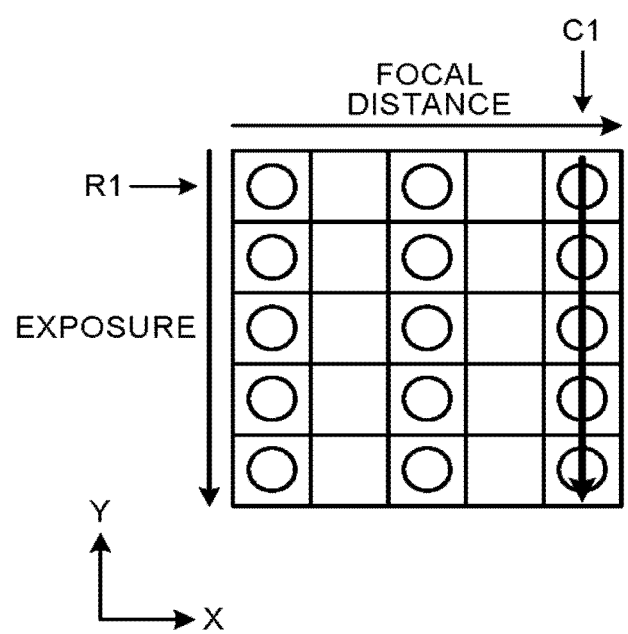
FIG. 3 is a top view illustrating an example of pattern formation on a substrate to be processed.
Figure 4C:
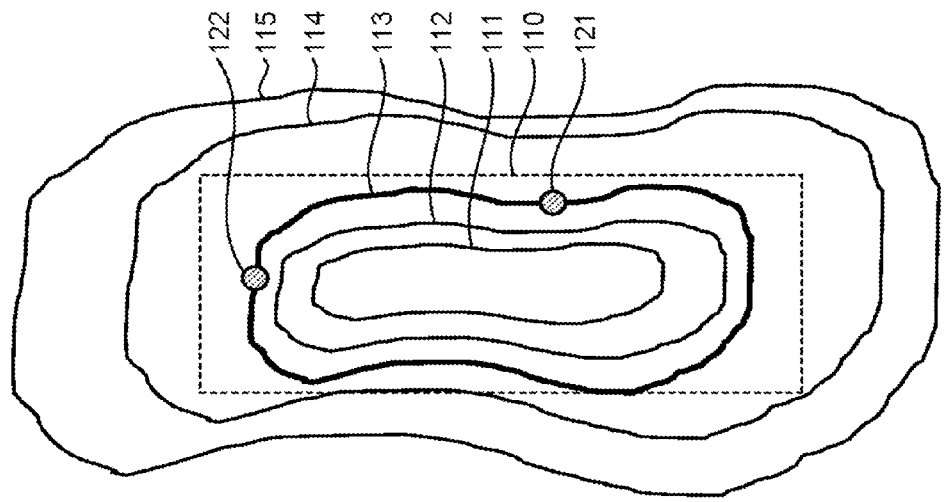
FIGS. 4A to 4C are diagrams each illustrating an example of the procedure in the pattern outline extraction method according to the first embodiment.
Figure 4B:
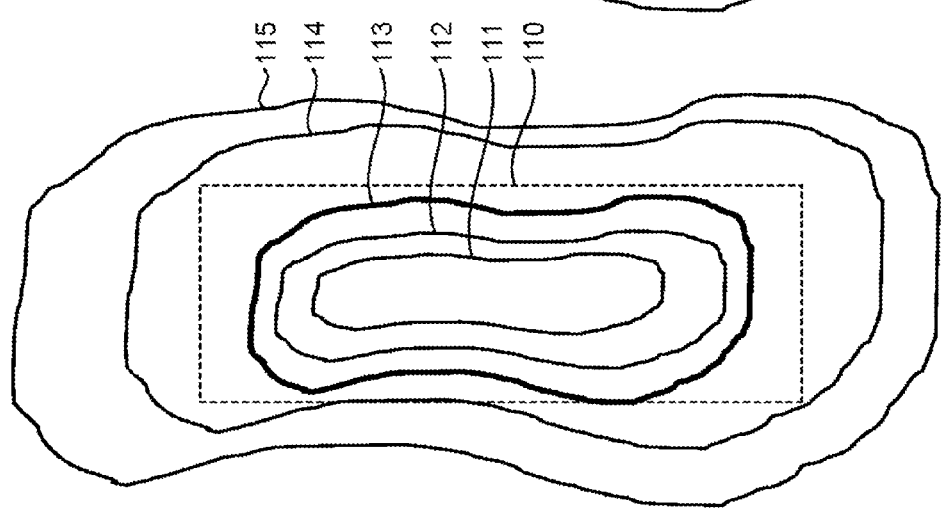
Figure 4A:
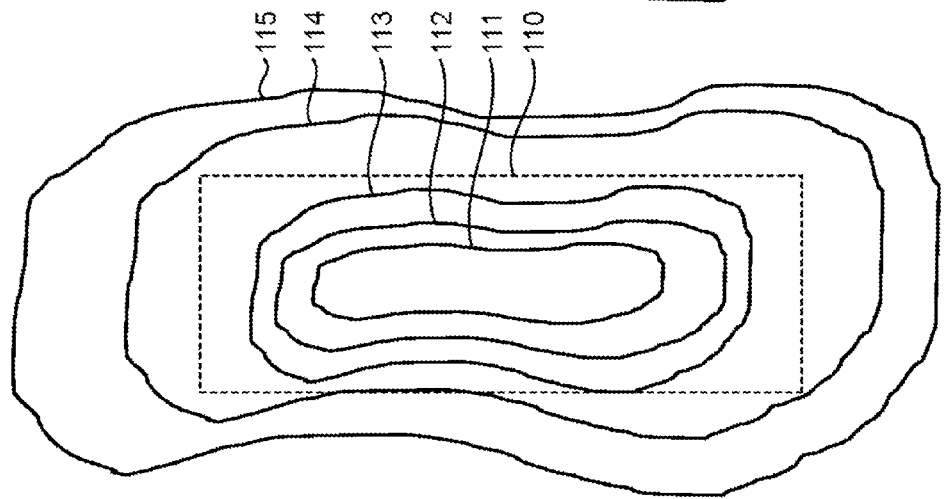
Figure 4E:
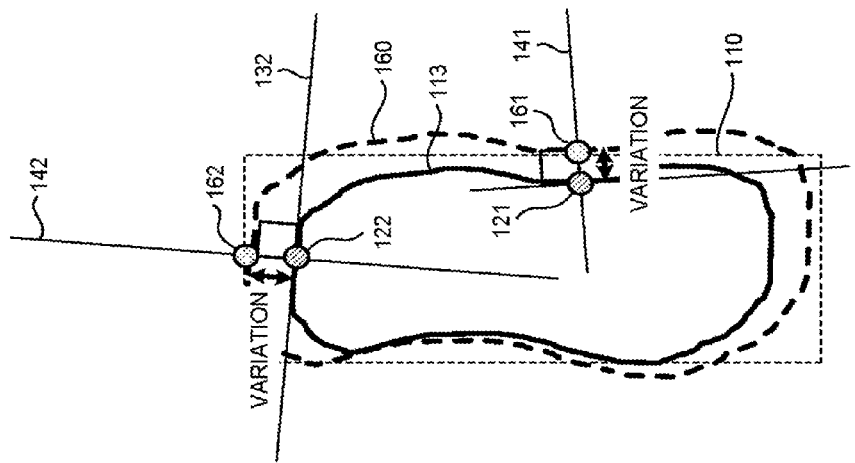
FIGS. 4D and 4E are diagrams each illustrating an example of the procedure in the pattern outline extraction method according to the first embodiment.
Figure 4D:
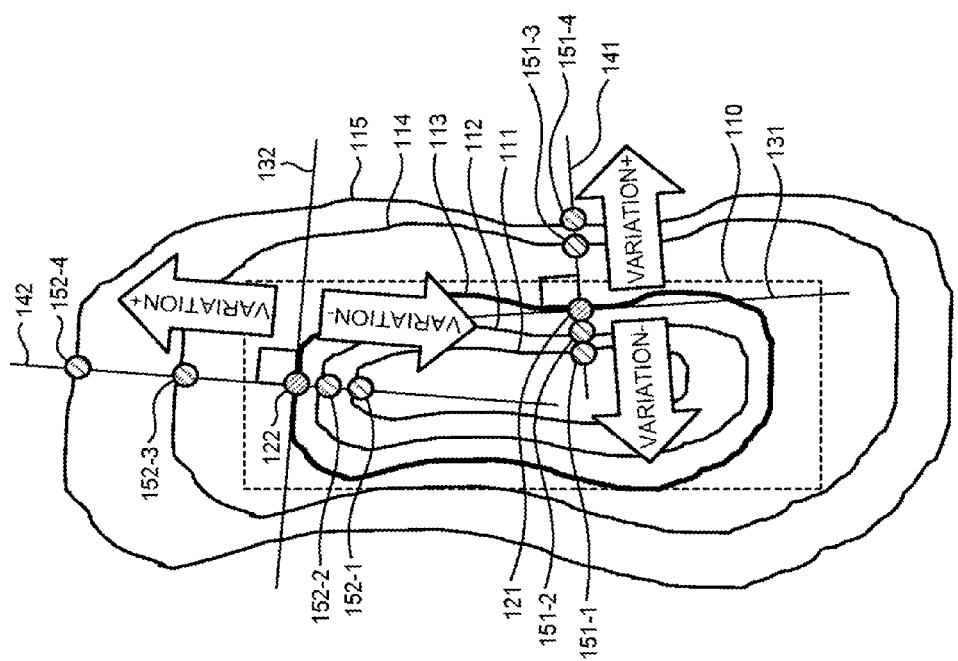
Figure 5A:
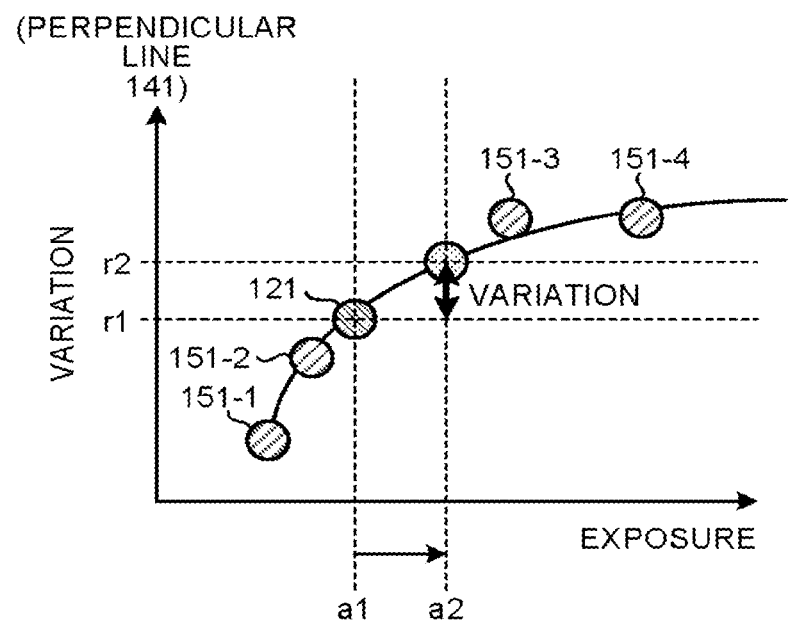
FIGS. 5A and 5B are diagrams each illustrating an example of variation-process condition correspondence information.
Figure 5B:
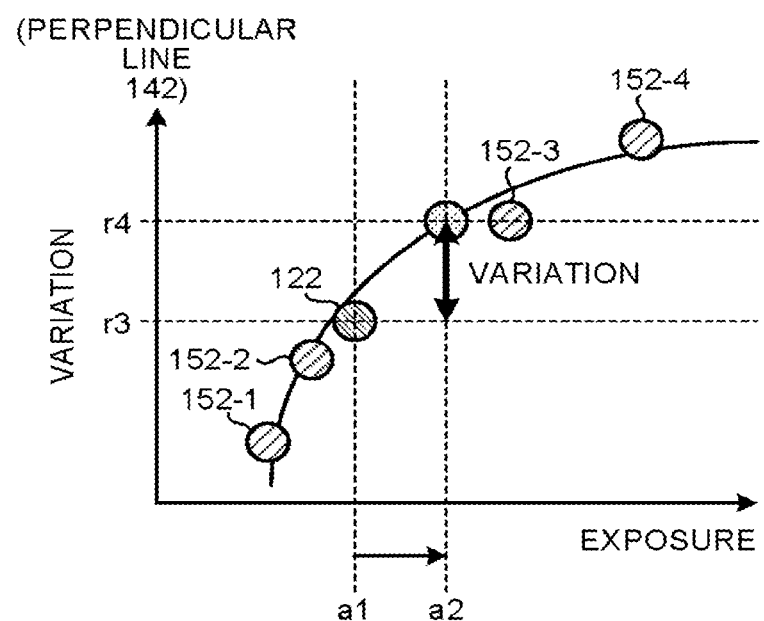

Next, there will be described a pattern outline extraction method employed by the pattern outline extraction system configured in the aforementioned manner. FIG. 2 is a flowchart illustrating an example of a procedure in the pattern outline extraction method according to the first embodiment. FIG. 3 is a top view illustrating an example of pattern formation on the substrate to be processed, FIGS. 4A to 4E are diagrams each illustrating an example of a procedure in the pattern outline extraction method according to the first embodiment, and FIGS. 5A and 5B are diagrams each illustrating an example of the variation-process condition correspondence information.

First, patterns to which the parameters of the process condition are assigned are formed on the substrate to be processed by exposure processing (step S11). Where an X axis and a Y axis orthogonal to each other are provided to the substrate to be processed as illustrated in FIG. 3, a shot region is arranged along the X axis and the Y axis. The parameter of the process condition is changed in each shot region. FIG. 3 illustrates the example where a focal distance is changed along the X axis while the exposure is changed along the Y axis. A pattern in a column C1 of the shot region arranged at the same position along the X axis is formed by the exposure processing that is performed under a condition in which the focal distance stays the same and the exposure increases in a positive direction along the Y axis, for example. Moreover, a pattern in a row R1 of the shot region arranged at the same position along the Y axis is formed by the exposure processing that is performed under a condition in which the exposure stays the same and the focal distance increases in a positive direction along the X axis. Note that a plurality of patterns is formed on the substrate to be processed by using the same mask but under different process conditions.

Next, the imaging unit 11 of the SEM 10 images the patterns formed on the substrate to be processed (step S12). Image data imaged by the imaging unit 11 is stored in the storage unit 12. Moreover, the image data stored in the storage unit 12 is transmitted from the communication unit 13 of the SEM 10 to the communication unit 21 of the pattern outline extraction device 20 and stored in the secondary storage unit 25.

After that, the image reading unit 261 of the pattern outline extraction device 20 reads the image data 25b stored in the secondary storage unit 25, and the outline extraction unit 262 extracts outlines from the image data 25b (step S13). The outline superposition unit 263 superposes the outlines (step S14). The outlines are superposed such that centroid positions of acquired outlines 111 to 115 correspond as illustrated in FIG. 4A, for example. Moreover, the superposed outlines 111 to 115 are pattern outlines acquired when the exposure processing is performed on a design 110 of a certain pattern while setting the focal distance to a predetermined value and changing the exposure. Note that the size of the design in a minor axis direction is 60 nm, for example.

Next, the reference outline data setting unit 264 selects one of the plurality of superposed outlines and sets the outline to be the reference outline data (step S15). As illustrated in FIG. 4B, the outline 113 out of the plurality of outlines 111 to 115 is selected in this case as the reference outline data.

The measurement point setting unit 265 then sets a measurement point on the reference outline data (step S16). It is assumed as illustrated in FIG. 4C that a single measurement point 121 is set on reference outline data 113.

Next, the variation calculation unit 266 finds a tangent line at the measurement point on the reference outline data and draws a line perpendicular to the tangent line at the measurement point (step S17). As illustrated in FIG. 4D, a tangent line 131 is drawn with respect to the measurement point 121 on the reference outline data 113, and a perpendicular line 141 of the tangent line 131 is drawn with respect to the measurement point 121.

The variation calculation unit 266 further calculates distances on the perpendicular line between the reference outline data and another outline as the variations (step S18). Specifically, as illustrated in FIG. 4D, points of intersection 151-1 to 151-4 of the perpendicular line 141 and the outlines 111, 112, 114, and 115 are found on the perpendicular line 141. Then, the distance between the measurement point 121 and each of the points of intersection 151-1 to 151-4 is found on the perpendicular line 141. In other words, the variation at each of the points of intersection 151-1 to 151-4 relative to the measurement point 121 is found on the perpendicular line 141. The variation is associated with the measurement point 121 or the perpendicular line 141. Here, the direction directed outward from the reference outline data 113 is set as a positive direction, while the direction directed inward is set as a negative direction.

Subsequently, the variation-process condition correspondence information calculation unit 267 graphically represents the variations with respect to the parameters of the process condition (step S19). Where a coordinate system has an X axis representing the exposure as the process condition and a Y axis representing the variation as illustrated in FIGS. 5A and 5B, a relationship between the exposure and the variation pertaining to a certain perpendicular line is plotted on the coordinate system. FIG. 5A is a diagram in which the variation with respect to the exposure for the perpendicular line 141 is plotted.

Moreover, the variation-process condition correspondence information calculation unit 267 calculates the variation-process condition correspondence information 25c obtained by using the least squares method and approximating the relationship between the parameters of the process condition and the variations that are graphically represented (step S20). There is a correlation between the exposure and the variation as illustrated in FIG. 5A, where the approximation between the exposure and the variation is calculated by using the least squares method. The calculated variation-process condition correspondence information 25c is stored in association with the measurement point 121 or the perpendicular line 141 into the secondary storage unit 25.

Next, the measurement point setting unit 265 determines whether to set another measurement point (step S21). The procedure returns to step S16 when setting the other measurement point (Yes in step S21), whereby the aforementioned processing in each of steps S16 to S20 is performed.

A measurement point 122 is set as illustrated in FIG. 4C, for example. Then, as illustrated in FIG. 4D, a tangent line 132 is drawn with respect to the measurement point 122 on the reference outline data 113, and a perpendicular line 142 of the tangent line 132 is drawn with respect to the measurement point 122. Points of intersection 152-1 to 152-4 of the perpendicular line 142 and the outlines 111, 112, 114 and 115 are also found, and then a variation from the measurement point 122 at each of the points of intersection 152-1 to 152-4 is found along the perpendicular line 142. The variation is associated with the measurement point 122 or the perpendicular line 142. After that, the variation along the perpendicular line 142 with respect to the exposure is plotted as illustrated in FIG. 5B, so that the least squares method is used to calculate the variation-process condition correspondence information 25c on the perpendicular line 142.

While only the two measurement points 121 and 122 are illustrated in FIGS. 4C and 4D, five or more measurement points are set in practice. The aforementioned processing is then performed on each measurement point.

When the other measurement point is not set in step S21 (No in step S21), the outline calculation unit 268 acquires the process condition to acquire a desired design pattern (step S22). Moreover, the outline calculation unit 268 acquires, for each measurement point (perpendicular line), the variation corresponding to the acquired process condition (step S23) by using the variation-process condition correspondence information 25c for each measurement point.

On the perpendicular line 141, for example, it is assumed that the exposure corresponding to the reference outline data 113 equals a1 and the variation at that time equals r1, as illustrated in FIG. 5A. When a desired exposure equals a2, the corresponding variation equals r2 according to the variation-process condition correspondence information 25c. As a result, the variation for the desired exposure a2 equals r2-r1.

On the perpendicular line 142, it is assumed that the exposure corresponding to the reference outline data 113 equals a1 and the variation at that time equals r3, as illustrated in FIG. 5B. When a desired exposure equals a2, the corresponding variation equals r4 according to the variation-process condition correspondence information 25c. As a result, the variation for the desired exposure a2 equals r4-r3. The variation on each perpendicular line for the desired exposure a2 is calculated in this manner.

Subsequently, the outline calculation unit 268 finds, as a calculated point, a position away from the reference outline data (measurement point) by the amount corresponding to the acquired variation on the perpendicular line passing through each measurement point (step S24). As illustrated in FIG. 4E, for example, the variation found in step S23 is added to the measurement points 121 and 122 on the reference outline data 113 along the perpendicular lines 141 and 142. On the perpendicular line 141, the variation r2-r1 is added outward from the measurement point 121 to find a calculated point 161. On the perpendicular line 142, the variation r4-r3 is added outward from the measurement point 122 to find a calculated point 162. Although not illustrated, a calculated point for another perpendicular line is calculated in a similar manner.

The outline calculation unit 268 then connects the calculated points found in step S24 and calculates a predicted outline under a desired process condition (step S25). As illustrated in FIG. 4E, for example, by connecting the calculated points 161 and 162, a predicted outline 160 is calculated. Note that, as is understood from the aforementioned description, precision of the shape of the predicted outline 160 is increased by setting a number of measurement points (perpendicular lines). However, an operation time gets longer as a number of measurement points (perpendicular lines) are set. It is thus desired to set the number of measurement points (perpendicular lines) such that the operation time falls within what is practical. The processing is now completed.

An elliptical aperture pattern is illustrated as an example in FIGS. 4A to 4E and 5A and 5B. However, the first embodiment can be applied to a wiring pattern as well. FIGS. 6A and 6B are diagrams each illustrating another example of the procedure in the pattern outline extraction method according to the first embodiment, and FIGS. 7A and 7B are diagrams each illustrating an example of the variation-process condition correspondence information.

It is assumed, for a pattern forming a design 210, that the exposure processing is performed while setting the focal distance to a predetermined value and assigning the exposure to form the wiring pattern on the substrate to be processed. The wiring pattern being formed is imaged by the SEM 10, and an outline is extracted by the pattern outline extraction device 20. Then, a plurality of outlines 211 to 215 is superposed as illustrated in FIG. 6A. The outline 213 is set as the reference outline data in this case.

Measurement points 221 and 222 are set on the reference outline data 213 and, with respect to the measurement points 221 and 222, perpendicular lines 241 and 242 corresponding to tangent lines 231 and 232 are drawn. Points of intersection 251-1 to 251-4 of the perpendicular line 241 and each of the outlines 211, 212, 214 and 215 are found so that a variation relative to the measurement point 221 is found at each of the points of intersection 251-1 to 251-4. Likewise, on the perpendicular line 242, points of intersection 252-1 to 252-4 of the perpendicular line 242 and each of the outlines 211, 212, 214 and 215 are found so that a variation relative to the measurement point 222 is found at each of the points of intersection 252-1 to 252-4.

Figure 7A:
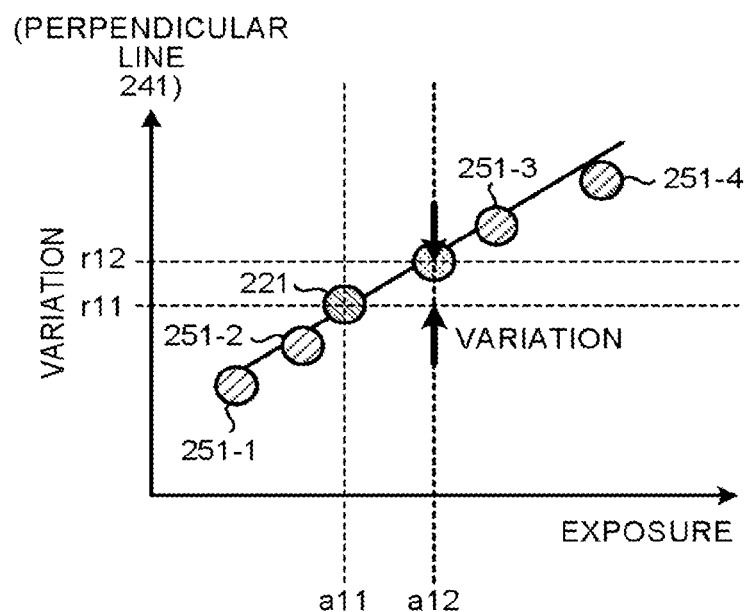
FIGS. 7A and 7B are diagrams each illustrating an example of variation-process condition correspondence information.
Figure 7B:
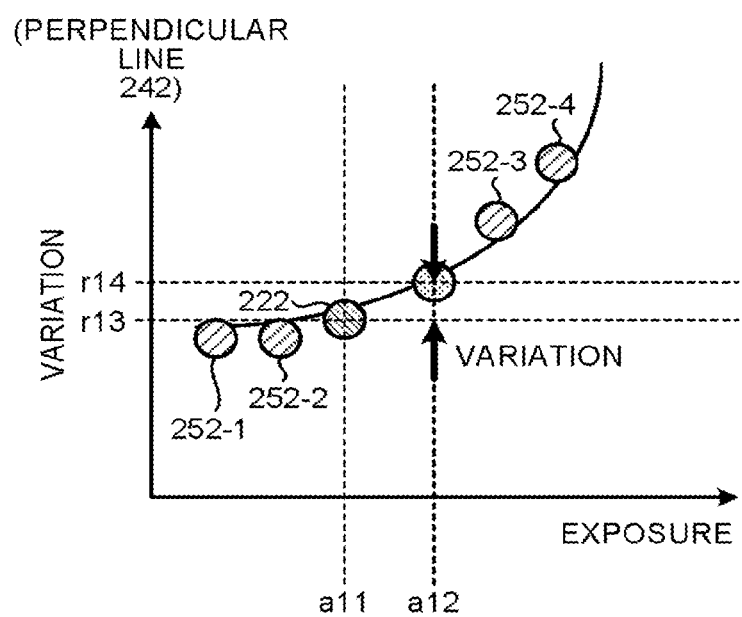

After that, a relationship between the exposure and the variation for each of the perpendicular lines 241 and 242 is plotted as illustrated in FIGS. 7A and 7B, so that the least squares method is used to calculate the variation-process condition correspondence information 25c indicating the relationship between the two. Moreover, a variation of the outline relative to the reference outline data 213 is calculated with respect to a desired exposure. On the perpendicular line 241, for example, it is assumed that the exposure corresponding to the reference outline data 213 equals a11 and the variation at that time equals r11 as illustrated in FIG. 7A, in which case the variation under a desired exposure a12 equals r12. The variation relative to the reference outline data 213 thus equals r12-r11. On the perpendicular line 242, it is assumed that the exposure corresponding to the reference outline data 213 equals a11 and the variation at that time equals r13 as illustrated in FIG. 7B, in which case the variation under the desired exposure a12 equals r14. The variation relative to the reference outline data 213 thus equals r14-r13.

After that, as illustrated in FIG. 6B, calculated points 271 and 272 obtained by adding the variations r12-r11 and r14-r13 to the measurement points 221 and 222 are calculated on the perpendicular lines 241 and 242 of the reference outline data 213, respectively. A predicted outline 270 is thus acquired by connecting the calculated points 271 and 272.

In the aforementioned description, there has been illustrated a case where there is extracted the outline of the pattern formed by fixing the depth of focus and changing the exposure as the process condition. It may however be adapted to extract the outline of a pattern formed by fixing the exposure and changing the depth of focus as the process condition.

The first embodiment is adapted to superpose the outlines of the pattern subjected to the exposure processing under the process condition and set the reference outline data from among the outlines. The measurement point is set on the reference outline data, and the perpendicular line is drawn with respect to the tangent line at the measurement point. After that, the variation relative to the measurement point is measured at the point of intersection of the perpendicular line and each outline, so that the variation-process condition correspondence information indicating the relationship between the process condition and the variation on each perpendicular line is calculated. The variation corresponding to the desired process condition is acquired from the variation-process condition correspondence information for each perpendicular line. Then, the calculated point obtained by adding each variation to each measurement point is calculated on each perpendicular line, and the predicted outline is found by connecting the calculated points. As a result, an average value (median value) of the outlines of the pattern under the desired process condition can be acquired with high precision even when the number of patterns imaged by the SEM 10 is small.

The method of a related art has been adapted to prepare a number of substrates to be processed having a pattern that is formed by transferring thereto a pattern formed in a mask while changing the depth of focus and exposure, so that the pattern on each substrate to be processed is imaged to extract an outline of the pattern. This has required an enormous amount of time in extracting the outline. In the first embodiment, however, there need be prepared only one substrate to be processed having a pattern that is formed by transferring thereto a pattern formed in a mask while changing the depth of focus and exposure. As a result, the time required to extract the outline can be cut down compared to the time required in the method of the related art.

Furthermore, in the method of the related art, the pattern is formed under the process condition provided to acquire a desired pattern so that the variation of the outlines is acquired. This means that when a pattern is formed under another process condition, a number of patterns formed under the other process condition have been required. In the first embodiment, however, the variation-process condition correspondence information is found so that a change in the outline upon changing the process condition can be acquired without forming a new test pattern.

Second Embodiment

In the first embodiment, the perpendicular line that is perpendicular to the tangent line at the measurement point on the reference outline data is used as the predetermined straight line passing through the measurement point. The use of this perpendicular line has been illustrated as an example, where another line may be used as the predetermined straight line passing through the measurement point. In a second embodiment, there will be described a case where a straight line passing through the centroid of an outline is used as the predetermined straight line passing through the measurement point.

Figure 8:
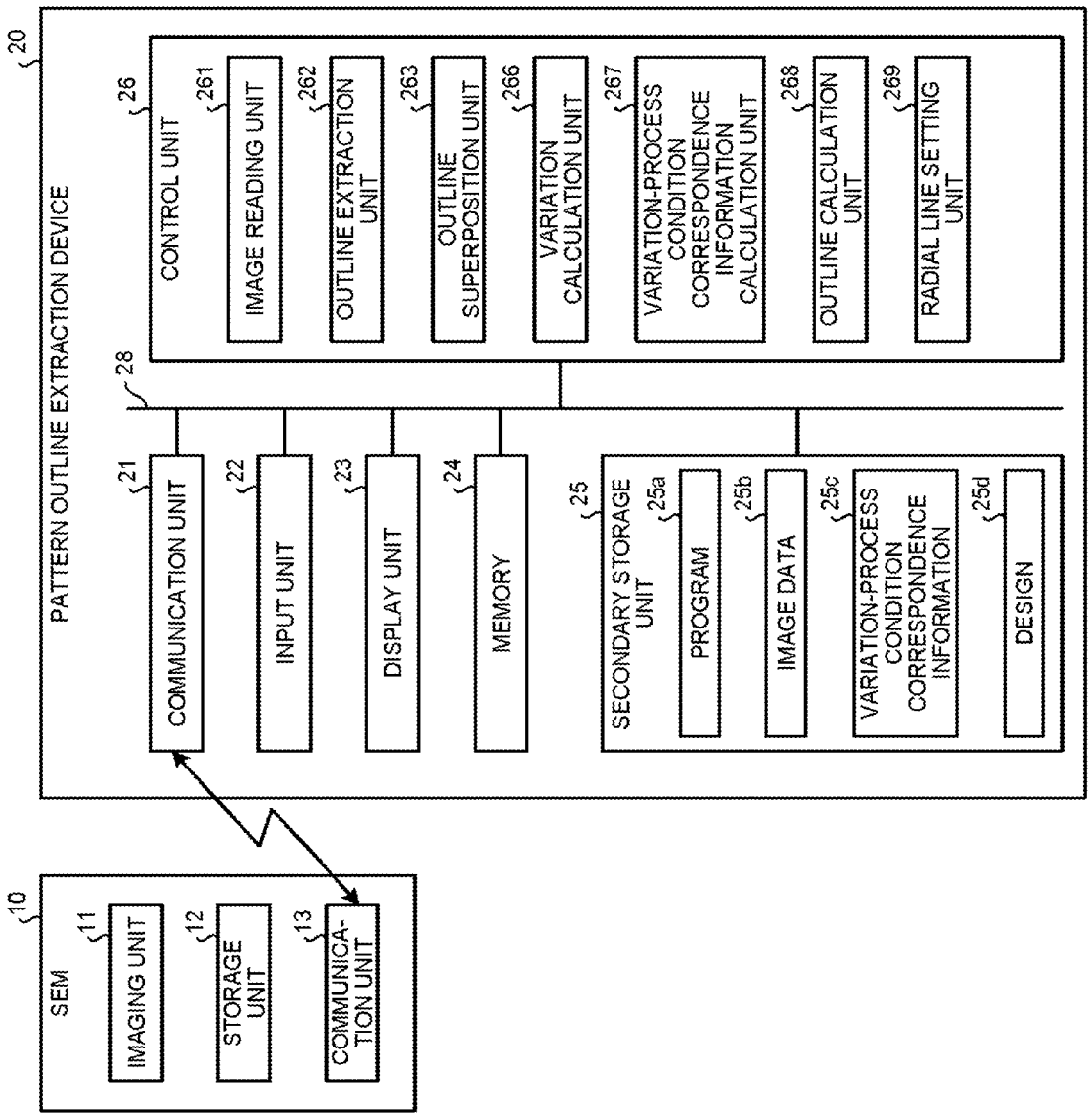
FIG. 8 is a block diagram illustrating an example of a configuration of a pattern outline extraction system according to a second embodiment.

FIG. 8 is a block diagram illustrating an example of a configuration of a pattern outline extraction system according to the second embodiment. The configuration of the pattern outline extraction system according to the second embodiment is substantially the same as that of the first embodiment described with reference to FIG. 1, whereby only a part different from the first embodiment will be described.

A secondary storage unit 25 of a pattern outline extraction device 20 stores a design 25d in addition to a program 25a, image data 25b and variation-process condition correspondence information 25c. The design 25d is design data on which a pattern to be imaged is based.

A control unit 26 of the pattern outline extraction device 20 includes an image reading unit 261, an outline extraction unit 262, an outline superposition unit 263, a radial line setting unit 269, a variation calculation unit 266, a variation-process condition correspondence information calculation unit 267, and an outline calculation unit 268.

The image reading unit 261 reads the design 25d along with the image data 25b. The outline superposition unit 263 superposes the design 25d and an outline extracted from the image data 25b. A method of performing the superposition includes, for example, calculating a centroid position of the design and a centroid position of the outline and then superposing the design and a plurality of outlines such that the centroid positions correspond with one another.

The radial line setting unit 269 performs processing that draws a predetermined number of radial lines from the centroid position of the design. The number of radial lines may be set by a user through an input unit 22 or determined in advance.

The variation calculation unit 266 finds a measurement point at which the radial line intersects with the design as well as a point of intersection of the radial line and the outline, and calculates a variation relative to the measurement point at each point of intersection. The variation calculation unit 266 performs this processing for each radial line. The radial line setting unit 269 and the variation calculation unit 266 constitute a variation calculation unit.

The rest of the processing units are similar to what has been described in the first embodiment and thus will not be described.

Figure 9:
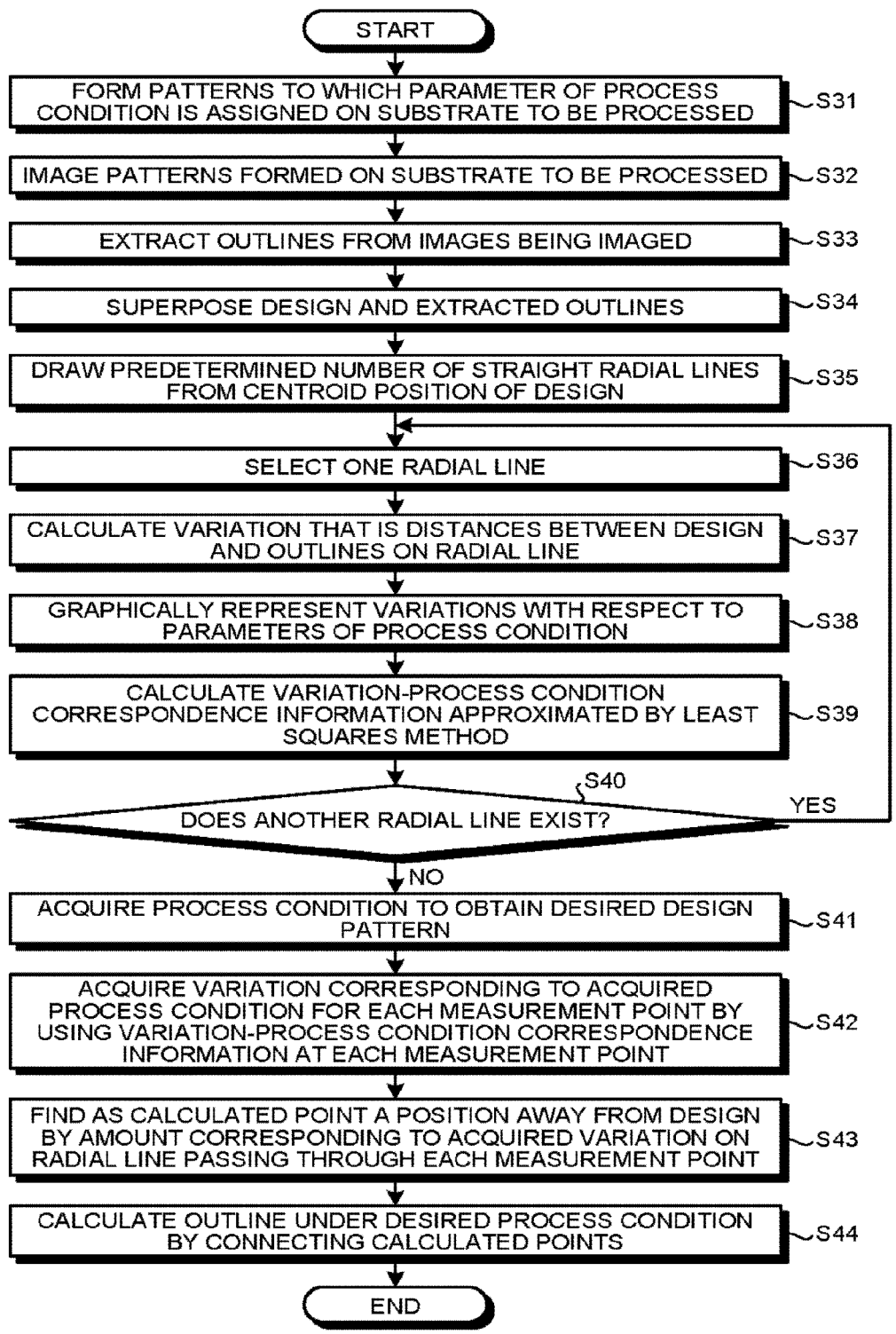
FIG. 9 is a flowchart illustrating an example of a procedure in a pattern outline extraction method according to the second embodiment.
Figure 10B:
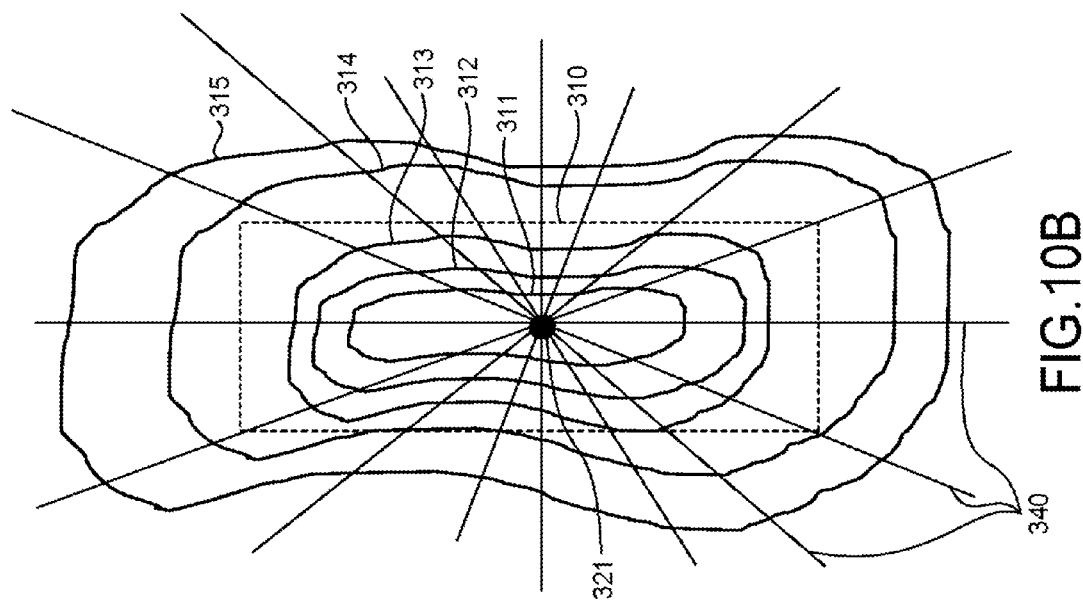
FIGS. 10A and 10B are diagrams each illustrating an example of the procedure in the pattern outline extraction method according to the second embodiment.
Figure 10A:
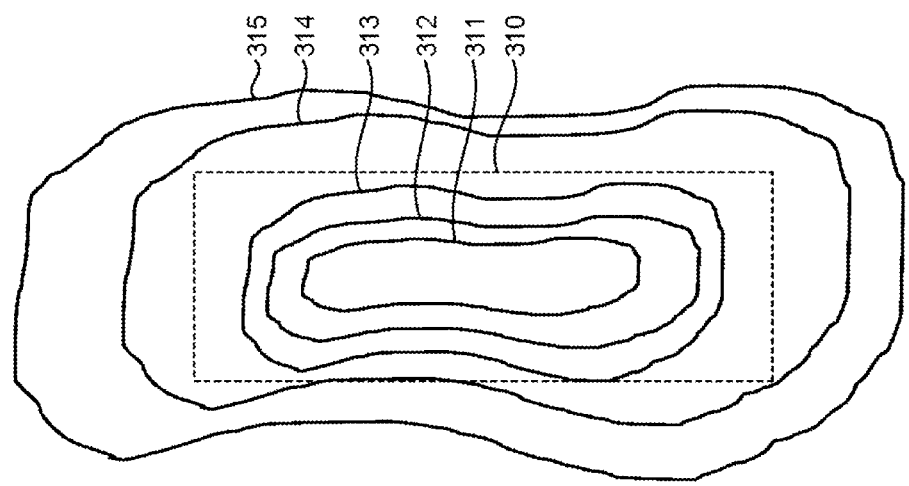

Next, there will be described a pattern outline extraction method employed by the pattern outline extraction system configured in the aforementioned manner. FIG. 9 is a flowchart illustrating an example of a procedure in the pattern outline extraction method according to the second embodiment. FIGS. 10A to 10D are diagrams each illustrating an example of the procedure in the pattern outline extraction method according to the second embodiment, and FIGS. 11A and 11B are diagrams each illustrating an example of the variation-process condition correspondence information.

First, as with steps S11 and S12 in FIG. 2 of the first embodiment, patterns to which parameters of a process condition are assigned are formed on a substrate to be processed by exposure processing, and then an SEM 10 images image data of the pattern (steps S31 and S32). The image data is transmitted from the SEM 10 to the pattern outline extraction device 20 and stored in the secondary storage unit 25.

Next, the image reading unit 261 of the pattern outline extraction device 20 reads the image data 25b and the design 25d stored in the secondary storage unit 25, and the outline extraction unit 262 extract outlines from the image data 25b (step S33). The outline superposition unit 263 superposes the design 25d and the extracted outlines (step S34). The design and the outlines are superposed such that a centroid position of a design 310 and centroid positions of outlines 311 to 315 correspond as illustrated in FIG. 10A, for example.

After that, the radial line setting unit 269 draws a predetermined number of straight radial lines from the centroid position of the design (step S35). FIG. 10B illustrates an example where 16 straight radial lines 340 are drawn from an origin being a centroid position 321 of the design 310.

Next, the variation calculation unit 266 selects one radial line (step S36) and calculates a variation being the distance between the design and the outline on the selected radial line (step S37). It is assumed that a radial line 341 is selected as illustrated in FIG. 10C. In this case, a measurement point 331 that is a point of intersection of the radial line 341 and the design 310 as well as points of intersection 351-1 to 351-5 of the radial line 341 and the outlines 311 to 315 are found. The variation relative to the measurement point 331 is then calculated at each of the points of intersection 351-1 to 351-5. The variation is associated with the radial line 341 or the measurement point 331. Here, the direction directed outward from the design 310 is set as a positive direction, while the direction directed inward (toward the centroid position 321) is set as a negative direction.

Subsequently, the variation-process condition correspondence information calculation unit 267 graphically represents the variations with respect to the parameters of the process condition (step S38). Where a coordinate system has an X axis representing the exposure as the process condition and a Y axis representing the variation as illustrated in FIGS. 11A and 11B, a relationship between the exposure and the variation is plotted on the coordinate system. FIG. 11A is a diagram in which the variation along the radial line 341 with respect to the exposure is plotted.

The variation-process condition correspondence information calculation unit 267 further calculates the variation-process condition correspondence information 25c obtained by using the least squares method and approximating the relationship between variations and the parameters of the process condition that are graphically represented (step S39). There is a correlation between the exposure and the variation as illustrated in FIG. 11A, where the approximation between the exposure and the variation is calculated by using the least squares method. The calculated variation-process condition correspondence information 25c is stored in association with the radial line 341 or the measurement point 331 into the secondary storage unit 25.

Next, the variation calculation unit 266 determines whether there exists another radial line (step S40). The procedure returns to step S36 when there exists the other radial line (Yes in step S40), whereby the aforementioned processing in each of steps S36 to S39 is performed.

Figure 10D:
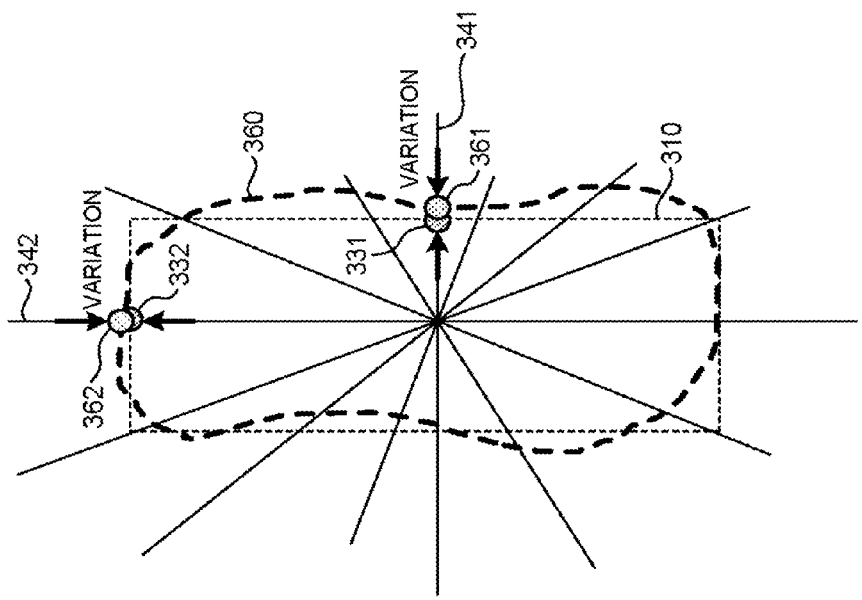
FIGS. 10C and 10D are diagrams each illustrating an example of the procedure in the pattern outline extraction method according to the second embodiment.
Figure 10C:
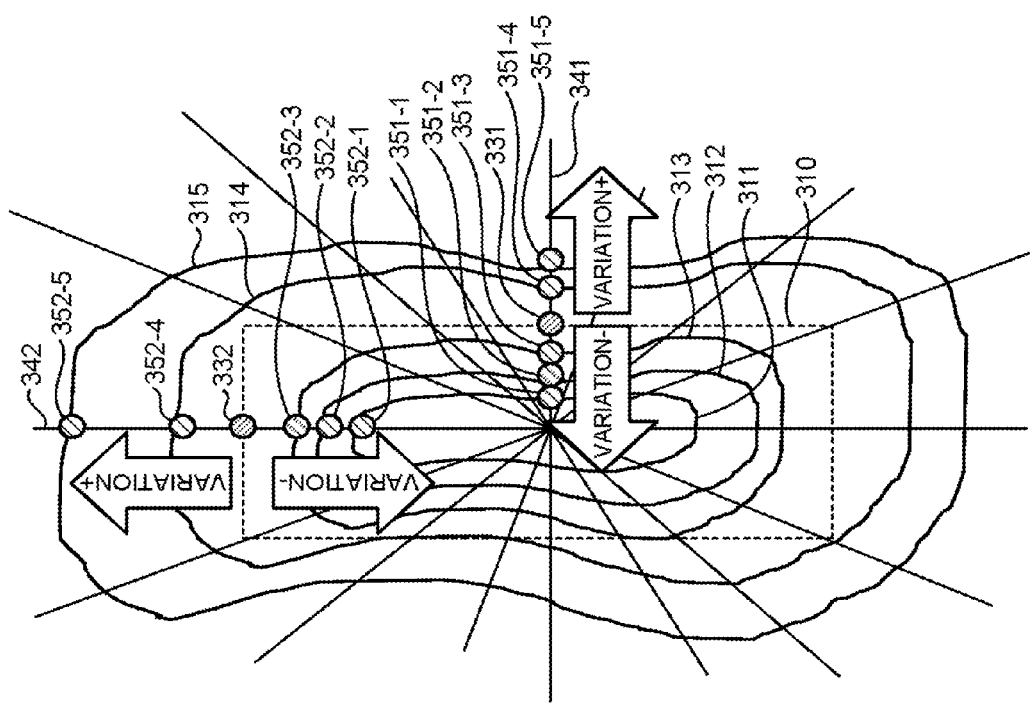
Figure 11A:
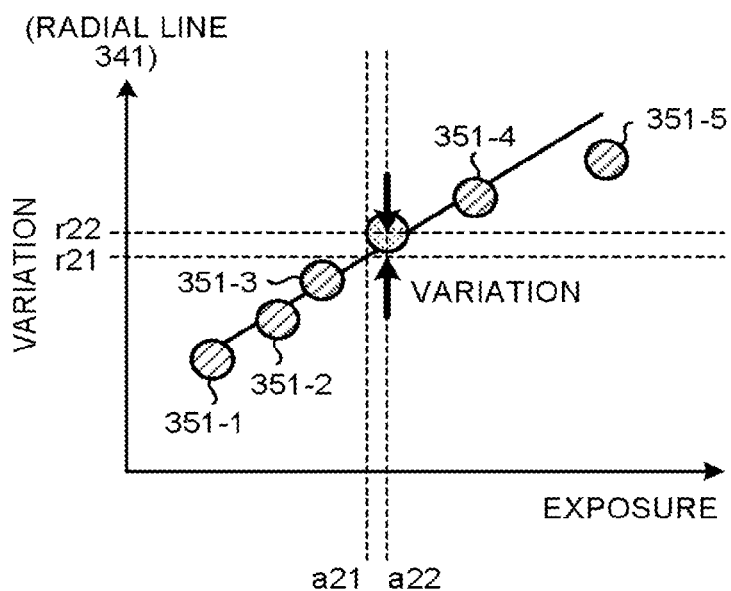
FIGS. 11A and 11B are diagrams each illustrating an example of variation-process condition correspondence information.
Figure 11B:
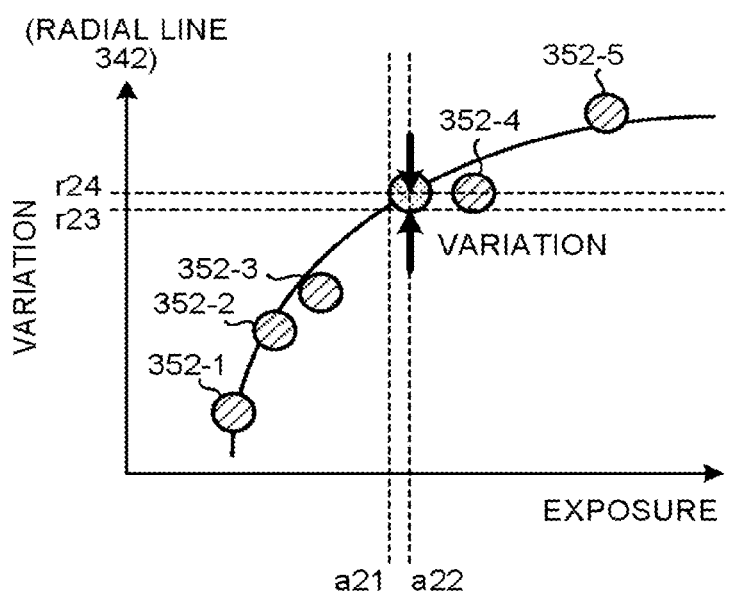

It is assumed that a radial line 342 is selected as illustrated in FIG. 10D. In this case, a measurement point 332 that is a point of intersection of the radial line 342 and the design 310 as well as points of intersection 352-1 to 352-5 of the radial line 342 and the outlines 311 to 315 are found. The variation relative to the measurement point 332 on the radial line 342 is then calculated at each of the points of intersection 352-1 to 352-5. The variation is associated with the radial line 342 or the measurement point 332. After that, the relationship between the exposure and the variation on the radial line 342 is plotted as illustrated in FIG. 11B, so that the least squares method is used to calculate the variation-process condition correspondence information 25c on the radial line 342. This processing is performed on all the radial lines.

When the other radial line does not exist in step S40 (No in step S40), the outline calculation unit 268 acquires the process condition to acquire a desired design pattern (step S41). Moreover, the outline calculation unit 268 acquires, for each measurement point or radial line, the variation corresponding to the acquired process condition (step S42) by using the variation-process condition correspondence information 25c for each measurement point.

On the radial line 341, for example, it is assumed that the exposure corresponding to the design 310 equals a21 and the variation at that time equals r21, as illustrated in FIG. 11A. When a desired exposure equals a22, the corresponding variation equals r22 according to the variation-process condition correspondence information 25c. As a result, the variation relative to the measurement point 331 under the desired exposure a22 equals r22-r21.

On the radial line 342, it is assumed that the exposure corresponding to the design 310 equals a21 and the variation at that time equals r23, as illustrated in FIG. 11B. When the desired exposure equals a22, the corresponding variation equals r24 according to the variation-process condition correspondence information 25c. As a result, the variation relative to the measurement point 332 under the desired exposure a22 equals r24-r23. The variation on each radial line under the desired exposure a22 is calculated in this manner.

Subsequently, the outline calculation unit 268 finds, as a calculated point, a position away from the design 310 (measurement point) by the amount corresponding to the acquired variation on the radial line passing through each measurement point (step S43). As illustrated in FIG. 10D, for example, the variation found in step S42 is added to the measurement points 331 and 332 along the radial lines 341 and 342. On the radial line 341, the variation r22-r21 is added outward from the measurement point 331 to find a calculated point 361. On the radial line 342, the variation r24-r23 is added outward from the measurement point 332 to find a calculated point 362. Although not illustrated, a calculated point for another radial line is calculated in a similar manner.

The outline calculation unit 268 then calculates a predicted outline under a desired process condition (step S44) by connecting the calculated points found in step S43. As illustrated in FIG. 10D, for example, the calculated points 361 and 362 are connected to calculate a predicted outline 360. Note that, as is understood from the aforementioned description, precision of the shape of the predicted outline 360 is increased by setting a number of radial lines. However, an operation time gets longer as a number of radial lines are set. It is thus desired to set the number of radial lines such that the operation time falls within what is practical. The processing is now completed.

According to the second embodiment, the effect similar to that of the first embodiment can be acquired.

The aforementioned description has illustrated the case where the image stored in the storage unit 12 of the SEM 10 is transmitted to the pattern outline extraction device 20 through the communication unit 13. Alternatively, however, the storage unit 12 of the SEM 10 may be formed of a removable storage medium so that, after the SEM 10 completes imaging, the storage medium is removed from the SEM 10 and mounted to the pattern outline extraction device 20 to read an image stored in the storage medium. A memory card or a universal serial bus (USB) memory can be used as the removable storage medium, for example.

The aforementioned pattern outline extraction method is provided as a program. The program is provided while recorded in a nontransitory computer-readable recording medium such as a CD-ROM, a flexible disk (FD), a CD-R, a digital versatile disk (DVD) or a memory card in an installable or executable file format.

Moreover, the program executing the aforementioned pattern outline extraction method may be stored on an information processing device connected to a network such as the Internet so that the program is provided by downloading via the network. The program executing the aforementioned pattern outline extraction method may also be provided or distributed via the network such as the Internet.

The program in which the pattern outline extraction method is described is loaded to a RAM being the memory 24 and executed by a CPU being the control unit 26 in the pattern outline extraction device 20, whereby the pattern outline extraction method described with reference to FIGS. 2 and 9 is performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern outline extraction device comprising:
a control unit including at least a central processing unit and a peripheral circuit that calculates a predicted outline of a pattern acquired under a desired process condition by use of image data of patterns formed by changing a process condition;
a non-volatile memory device that stores a program and data executed by the control unit; and
a memory that temporarily stores the program and the data stored in the non-volatile memory device to be executed by the control unit, wherein
the control unit in analyzing semiconductor circuit pattern:
reads the image data of the patterns formed by changing the process condition,
extracts outlines of the patterns from the image data formed under the process condition,
superposes the outlines,
sets measurement lines intersecting with the outlines being superposed,
calculates variations on the measurement lines relative to measurement points on the measurement lines at points of intersection of the measurement lines and the outlines,
calculates variation-process condition correspondence information indicating a relationship between the process conditions and the variations for the measurement lines,
calculates predicted variations on the measurement lines relative to the measurement points corresponding to a desired process condition based on the variation-process condition correspondence information,
calculates calculated points that are obtained by adding the predicted variations to the measurement points on the measurement lines for the measurement lines, and
calculates a predicted outline by connecting the calculated points.

2. The pattern outline extraction device according to claim 1 wherein, in the setting of the measurement lines, the control unit sets the measurement points on one reference outline selected from the outlines, and the measurement lines that are perpendicular lines of tangent lines at the measurement points set on the reference outline.

3. The pattern outline extraction device according to claim 1 wherein, in the calculation of the variation-process condition correspondence information, the control unit calculate an approximation curve obtained by plotting the process condition and the variation on a two-dimensional coordinate as the variation-process condition correspondence information.

4. The pattern outline extraction device according to claim 3, wherein, in the calculation of the variation-process condition correspondence information, the control unit finds the approximation curve by a least squares method.

5. The pattern outline extraction device according to claim 1, wherein
the control unit
reads a design on which the pattern is based also in the reading of the image data, superposes the outlines and the design in the superposition of the outlines,
sets a plurality of measurement lines originating from a centroid position of the design in the setting of the measurement lines, and
sets the points of intersection of the measurement lines and the design as the measurement points in the calculation of the variations.

6. The pattern outline extraction device according to claim 1, wherein the process condition is an exposure or a depth of focus.

7. The pattern outline extraction device according to claim 1 wherein, in the reading of the image data, the control unit reads five or more kinds of the image data of the patterns formed by changing the process condition.

8. A pattern outline extraction method comprising:
analyzing semiconductor circuit pattern by:
reading image data of patterns formed by changing a process condition;
extracting outlines of the patterns from the image data formed under the process condition;
superposing the outlines;
setting measurement lines intersecting with the outlines being superposed;
calculating variations on the measurement lines relative to measurement points on the measurement lines at points of intersection of the measurement lines and the outlines;
calculating variation-process condition correspondence information indicating a relationship between the process conditions and the variations for the measurement lines;
calculating predicted variations on the measurement lines relative to the measurement points corresponding to a desired process condition based on the variation-process condition correspondence information;
calculating calculated points that are obtained by adding the predicted variations to the measurement points on the measurement lines for the measurement lines; and
calculating a predicted outline by connecting the calculated points.

9. The pattern outline extraction method according to claim 8 wherein, in the setting of the measurement lines, the measurement points are set on one reference outline selected from the outlines, and the measurement lines are perpendicular lines of tangent lines at the measurement points set on the reference outline.

10. The pattern outline extraction method according to claim 8 wherein, in the calculating of the variation-process condition correspondence information,
an approximation curve obtained by plotting the process condition and the variation on a two-dimensional coordinate is calculated as the variation-process condition correspondence information.

11. The pattern outline extraction method according to claim 10, wherein, in the calculating of the variation-process condition correspondence information,
the approximation curve is found by a least squares method.

12. The pattern outline extraction method according to claim 8, wherein,
in the reading of the image data, a design on which the pattern is based is also read,
in the superposing of the outlines, the outlines and the design are superposed,
in the setting of the measurement lines, a plurality of measurement lines originating from a centroid position of the design are set, and
in the calculating of the variations, the points of intersection of the measurement lines and the design are set as the measurement point.

13. The pattern outline extraction method according to claim 8, wherein the process condition is an exposure or a depth of focus.

14. The pattern outline extraction method according to claim 8 wherein, in the reading of the image data, five or more kinds of the image data of the patterns formed by changing the process condition are read.

15. A computer program product that can be executed by a computer and includes a non-transitory computer-readable recording medium containing a plurality of commands given to calculate a predicted outline of a pattern obtained under a desired process condition by using image data of a pattern formed by changing a process condition, wherein the plurality of commands causes the computer to execute:
analyzing semiconductor circuit pattern by:
reading of the image data of patterns formed by changing the process condition;
extracting outlines of the patterns from the image data formed under the process condition;
superposing the outlines,
setting measurement lines intersecting with the outlines being superposed;
calculating variations on the measurement lines relative to measurement points on the measurement lines at points of intersection of the measurement lines and the outlines;
calculating variation-process condition correspondence information indicating a relationship between the process conditions and the variations for the measurement lines;
calculating a predicted variation on the measurement line relative to the measurement point corresponding to a desired process condition from the variation-process condition correspondence information;
calculating a calculated point obtained by adding the predicted variation to the measurement point on the measurement line for the measurement lines; and
calculating a predicted outline by connecting the calculated points.

16. The computer program product according to claim 15 wherein, in the setting of the measurement lines, the measurement points are set on one reference outline selected from the outlines, and the measurement lines are perpendicular lines of tangent lines at the measurement points set on the reference outline.

17. The computer program product according to claim 15 wherein, in the calculating of the variation-process condition correspondence information, an approximation curve obtained by plotting the process condition and the variation on a two-dimensional coordinate is calculated as the variation-process condition correspondence information.

18. The computer program product according to claim 17, wherein, in the calculating of the variation-process condition correspondence information, the approximation curve is found by a least squares method.

19. The computer program product according to claim 15, wherein
in the reading of the image data, a design on which the pattern is based is also read,
in the superposing of the outlines, the outlines and the design are superposed,
in the setting of the measurement lines, a plurality of measurement lines originating from a centroid position of the design are set, and
in the calculating of the variations, the points of intersection of the measurement lines and the design are set as the measurement point.

20. The computer program product according to claim 15, wherein the process condition is an exposure or a depth of focus.

* * * * *